US005853870A

United States Patent [19]

Uchimura et al.

[11] Patent Number: 5,853,870

[45] Date of Patent: Dec. 29, 1998

[54] BOTH-SIDE COATED PAPER COMPRISING KAOLIN FOR USE OF PRINTING

[75] Inventors: Shunichi Uchimura; Hideyuki Suzuki; Terunobu Fukui, all of Amagasaki, Japan

[73] Assignee: Oji Paper Co., Ltd., Japan

[21] Appl. No.: 881,358

[22] Filed: Jun. 24, 1997

[30] Foreign Application Priority Data

Jun. 27, 1996 [JP] Japan .................................... 8-167745

[51] Int. Cl.[6] ........................................................ B32B 5/16

[52] U.S. Cl. .......................... 428/329; 428/150; 428/331; 428/342

[58] Field of Search .................................... 428/329, 331, 428/341, 342, 149, 150

[56] References Cited

FOREIGN PATENT DOCUMENTS

| | | |
|---|---|---|
| 56-68188 | 6/1981 | Japan . |
| 07-119086 | 5/1985 | Japan . |
| 01-221596 | 9/1989 | Japan . |
| 02-269896 | 11/1990 | Japan . |
| 07-119085 | 5/1995 | Japan . |
| 07-127000 | 5/1995 | Japan . |
| 7-166492 | 6/1995 | Japan . |
| 09-268495 | 10/1997 | Japan . |
| 97-32082 | 9/1997 | WIPO . |

OTHER PUBLICATIONS

Yamoka et al, "Influence of Kinds of Clay and Binder on trhe Optical Properties of Clay–Coated Paper, " Kobe Joshi Daigaku Kaseigakubu Kiyo, 85–91, 1995.

*Primary Examiner*—H. Thi Le

*Attorney, Agent, or Firm*—Killworth, Gottman, Hagan & Schaeff, L.L.P.

[57] ABSTRACT

The coated paper provided by this invention is a high-quality both-side coated paper for use of printing which is finished by a high-temperature calender above 100° C. and excellent in gloss, print gloss, smoothness, ink receptivity, and stiffness.

The both-side coated paper for use of printing according to this invention has the characteristics that after the finish, the paper density is 1.15~1.35 g/cm$^3$, the gloss of coated paper surface is higher than 75%, the smoothness is lower than 20 mmHg, and further the mean value L of Clark free protruding lengths in the machine and cross directions measured pursuant to JIS P8143 A can satisfy the following equation (1) below:

$$L>1.28X+45 \quad (1),$$

where

L=Mean value of Clark free protruding lengths in the machine and cross directions (mm), and X=Product basis weight (g/m$^2$), and that the outermost coating layer on both sides of said coated paper contains the kaolin as a pigment whose average particle diameter is 0.5~1.0 $\mu$m, and content ratio is 50–80 wt % for the particles smaller than 1 $\mu$m in diameter and 5% or less than 5% for the particles larger than 3 $\mu$m in diameter, in an amount of 40~90 wt % of the total pigment used; the copolymer latex with a Tg of 25°~50° C. as the binder, in an amount of 5~30 wt % in terms of solid matter of the total pigment contained; and the coating weight per surface is 15~30 g/m$^2$ after the coating material is dried.

2 Claims, 2 Drawing Sheets

Fig. 1 Relationship between the basis weight and the stiffness
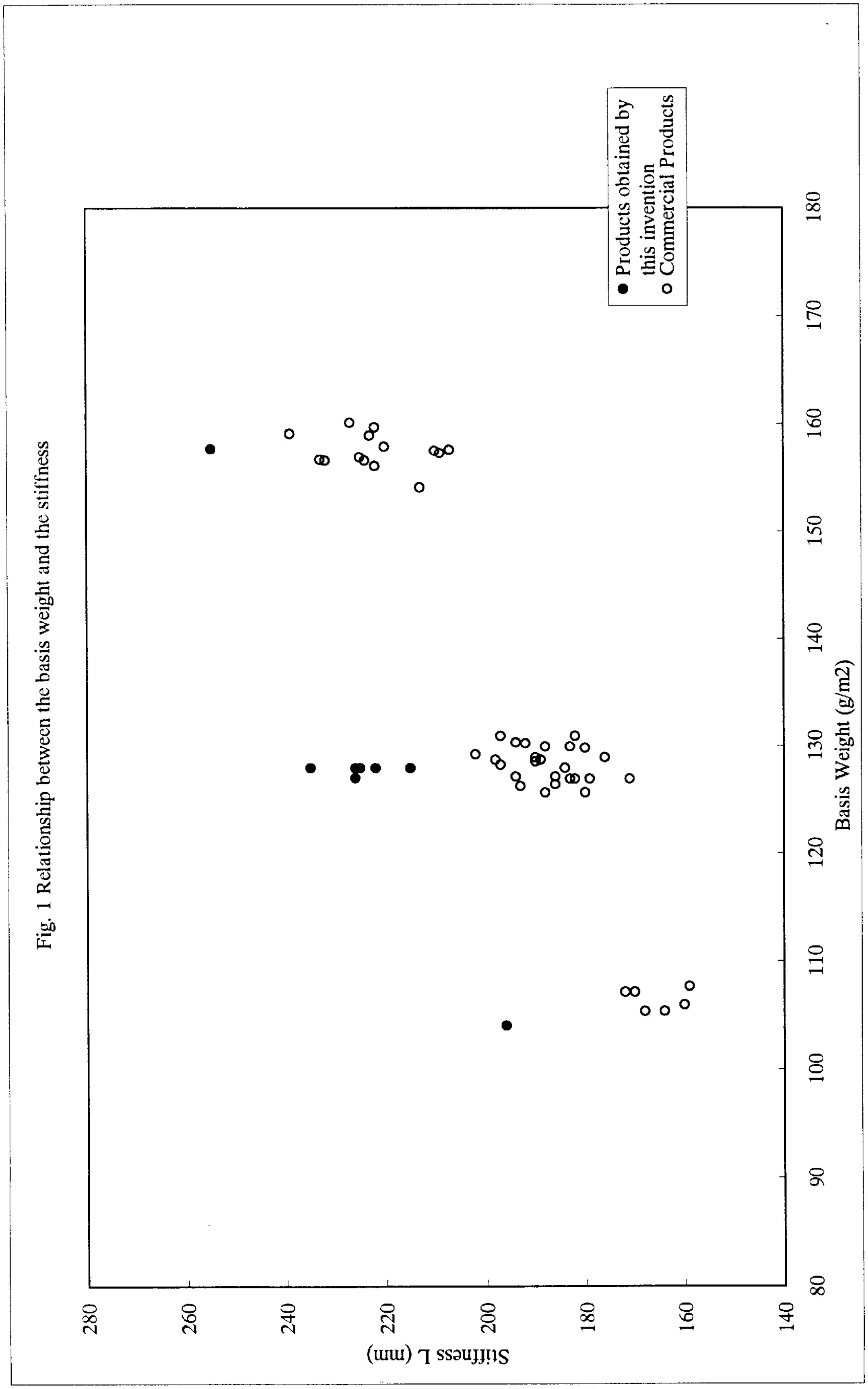

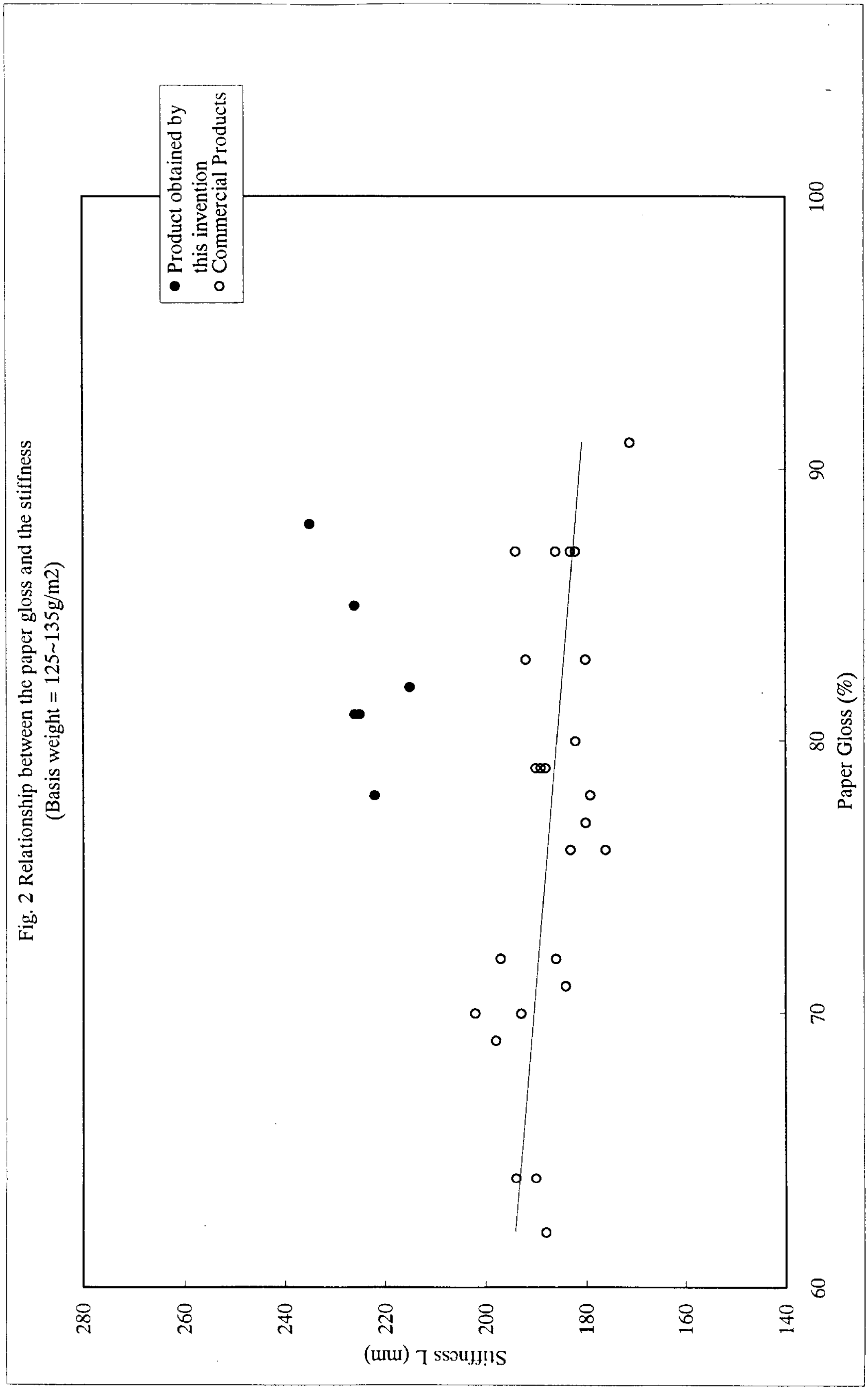
Fig. 2 Relationship between the paper gloss and the stiffness
(Basis weight = 125~135g/m2)

BOTH-SIDE COATED PAPER COMPRISING KAOLIN FOR USE OF PRINTING

BACKGROUND OF THE INVENTION

1. Field of the Invention

This invention relates to the both-side coated paper for use of printing, more particularly to the one with both high print and paper gloss, excellent smoothness and a high stiffness.

2. Description of the Prior Art

The coated paper for use of printing is generally required to have a high level of gloss and smoothness and excellent printability. Under the pressure of an increasing demand for high-speed printing spurred by the progress in printing techniques in recent years, there is a strong demand for the coated paper, particularly the one having a high stiffness, in addition to the above-mentioned quality characteristics relating to the runnablility and printability required at the time of printing.

If the coated paper has a high stiffness, it can smoothly pass through a high-speed printing machine for printing. As the paper stiffness increases, further, we can feel it bulky. More concretely, if the coated paper with a high stiffness are used for the text papers of a book, catalogue, etc., and when one takes such a book or catalogue in his hand by grasping its back, he would feel something of a hardness or heaviness as if he took a hardcover book, or a thicker book than the actual one held in his hand, and have a feeling of high class and gravity about this book or catalogue. So this coated paper for printing with high stiffness can enhance its commodity value.

The stiffness has a close relation with the basis weight of paper and density. There is a general trend that the stiffness increases as the basis weight increases, but it decreases as the paper density increases. Therefore, if a coated paper is increased in its basis weight and used for the text paper of a book or catalogue, it can make this book or catalogue heavy and look to be of a high class one, but the problem is that this book or catalogue would become heavier than necessary. Accordingly, the coated paper with high stiffness in spite of its moderate basis weight is in demand. The coated paper for printing is however required to have a high gloss and smoothness, besides a high stiffness. For the paper to have such quality characteristics, its density must be increased to some extent. In other words, calendering must be applied by all means to improve the paper gloss and smoothness. But any increase in the paper density through calendering will inevitably reduce the stiffness. Thus, the relationship between the gloss and stiffness and that between the smoothness and stiffness can act contrary to each other.

Various proposals have been made to improve the stiffness of coated paper for printing, which include, for example, the proposal of a high rate mixing of softwood pulp (NKP) for making base paper, the proposal of a high rate compounding of starch or copolymer latex with a high glass transition temperature (hereinafter referred to as "Tg") for preparing the coating material, etc.

However the problem in these methods of mixing a high rate of NKP in base paper or a high rate of starch in the coating material is that though they are useful in improving the paper stiffness, they can deteriorate the smoothness and gloss of the coated paper obtained.

For this reason, mixing a high percentage of copolymer latex with a high Tg (as a binder) has often been used as the means to improve the paper stiffness. Further, a calendering using a high temperature above 100° C. (which is called a gloss calender or soft calender) is made to further enhance the paper gloss, which could better develop by using the copolymer latex with a high Tg as the binders.

However, when any copolymer latex with a high Tg is used, it can weaken the adhesion of coating layer, resulting in its partial picking. The patent publication No. 56-68188 proposes a combined use of two types of copolymer latex with their Tg's being higher than 38° C. and 5°~25° C. respectively, to improve this problem.

However in this method, too, the Tg of the copolymer latex is too high, and the high temperature calender operation conditions must be more strengthened in order to obtain a sufficient adhesion of coating layer, but this would lower the printability of coated paper obtained and worsen the runnability of the calender.

An explanation will be added about the runnability of a high-temperature calender. In the treatment of coated paper by a calender, its coating layer containing such thermoplastic substances as said copolymer latex, etc. is treated by passing the paper under pressure through the calender nip consisting of the high-temperature metal rolls and elastic rolls; in doing so, said latex is plasticized by the heat and pressure applied to the paper web, giving an effective orientation to the pigment in the coating layer, or give the coated paper high gloss by copying the metal roll surface. In the above process, however, it has often happened that the coating layer is adhered to the high-temperature metal roll or elastic roll surfaces or partially peeled off by them, thus degrading the commodity value of the coated paper processed or contaminating the roll surfaces to deteriorate the operation of the calender.

As the means to prevent the roll surfaces from contamination or the adhesion of the coating layer to the roll surfaces, such measures have been taken as mixing in the coating materials releasing agents like wax, fatty acid, fatty acid salts, silicone resin, etc. or applying these releasing agents directly over said roll surfaces, but the problems in this case were that extra amount of releasing agents were accumulated on the roll surfaces to reduce the gloss of coated paper.

For the reasons mentioned above, it has never been possible for us to obtain any satisfactory paper stiffness even in the world's highest-class coated paper products for printing currently marketed, including the high-gloss coated paper for printing called "Super Art Paper" or "Art Paper" in the Japanese market and "Premium No. 1 grade" or "No. 1 grade" in the U.S. market.

Some details of this problem will be given below. JIS P8143 A prescribes one of the indicators of the paper stiffness (it is called Clark Method). This is an evaluation method that matches the feel of a sheet of paper (its stiffness) when it is taken up by fingers. This Clark Method provides that the stiffness is the measured paper free protruding length L (cm), raised to the third power and then divided by 100 (=$L^3/100$), but in this invention, the mean value of measured free protruding lengths L in machine and cross directions (MD and CD) is taken as the stiffness of paper L (mm). In the stiffness measurement for the papers with different basis weights, if their basis weight range is within about 80–160 g/m$^2$, a linear relation can be obtained between the basis weight and stiffness L, making easy the stiffness comparison between papers with different basis weights within this range. In this invention, therefore, the stiffness is defined as the Clark free protruding length L (mm). On the other hand, the degree of gloss is usually expressed by the value measured pursuant to JIS P8142. In this invention, the measurement of paper stiffness was conducted on the high-gloss both-side coated papers for use of printing (i.e., said Super Art or Art Paper, or Premium No. 1 grade or No. 1 grade in the market) whose gloss values were about 75% or above when measured pursuant to JIS P8142. The results were that the stiffness L was as small as about 150~172 mm in the papers with the basis weight of 100~110 g/m$^2$, 162~200 mm in those with the basis weight of 125~135 $g/m^2$ and 210~238 mm in those with the basis weight of 155~165 $g/m^2$.

BRIEF DESCRIPTION OF THE DRAWINGS

FIG. 1 shows the relations between the basis weight and stiffness of these papers in the market, where the mark ○ represents these papers and ● the product according to this invention. Their comparison would show that there is a clear difference between the conventional highest-class papers for printing and the product according to this invention and that the high-gloss both-side coated paper according to this invention is obviously a novel product that has never been put on sale.

FIG. 2 shows the relations between paper gloss and stiffness in both these conventional products and the product according to this invention those have the basis weight of 125~135 $g/m^2$, with its lateral and vertical axes representing the degree of gloss and the stiffness respectively. This graph clearly indicates that the product according to this invention is much higher in the stiffness than the conventional products while maintaining almost equal degree of gloss to the latter.

SUMMARY OF THE INVENTION

The inventor made careful studies on the relations between the pigments (the main ingredient of pigment coating layer) and binders for the purpose of obtaining excellent paper gloss, smoothness and print gloss using the means to pass the paper through a high-temperature calender, and as a result, has found that if the kaolin having a specific particle distribution is used, and also a copolymer latex with a relatively high glass transition temperature (hereinafter referred to as "Tg") is used as the binder, it is possible to obtain the above-mentioned both-side coated paper for printing which is excellent in the stiffness, and moreover good for the calender operation (i.e., the paper does not adhere to the roll surfaces), besides its high gloss and smoothness.

For said binders, by the way, two kinds of copolymer latex with the specific different Tgs, i.e., with higher and lower Tg's, or otherwise a relatively small amount of starch, may be used.

Therefore, this invention relates to the both-side coated paper for use of printing made by such process that the coating material containing a combination of some specific types of pigments and binders (as mentioned later) as the main ingredients is applied over the outermost surface on both sides of a base paper in an amount that can be 15–30 $g/m^2$ per surface after the coating material was dried, then dried and then passed through a high-temperature calender (above 100° C.) as the finishing process. More particularly, it relates to the both-side coated paper for printing whose gloss value after the coating and the finishing process measured pursuant to JIS P8142 is higher than 75%, whose smoothness value measured pursuant to Japan TAPPI paper and pulp test method No. 5A is lower than 20 mmHg and whose mean value L of the Clark free protruding lengths in the machine and cross directions measured pursuant to JIS P8143 A (this mean value L will hereinafter be referred to as "the stiffness") can satisfy the equation (1) below.

$$L>1.28X+45 \qquad (1),$$

where L=Stiffness (mm), and X=product basis weight ($g/m^2$)

To explain in more detail, in said both-side coated paper according to this invention:

(1) The kaolin, one of the pigments used, whose average particle diameter is 0.5~1.0 μm, and content ratio is 50~80 wt % for the particles of smaller than 1 μm in diameter, and 5% or less than 5% for those of larger than 3 μm in diameter, is contained in an amount of 40~90 wt % of the total pigment used.

(2) A copolymer latex with a Tg of 25°~50° C. (hereinafter referred to as "high Tg latex") is used as the binders, whose content ratio must be 5~30 wt % (in terms of solid matter) of the total pigment used.

According to this invention, a copolymer latex with a Tg of −30°~5° C. (b) may be mixed in said copolymer latex with a Tg of 25°~50° C. (a), preferably at a (a)/(b) mixing ratio of 9:1~5:5, and the total amount of (a) and (b) should be 5~30 wt % of the total pigment used in terms of solid matter. Using a mixture of such two kinds of high and low Tg latex can make it possible to improve the adhesion of the coating layer while maintaining the high stiffness coming from said high Tg latex, and further the use of a low Tg latex in an amount within said specified range can better balance the stiffness and the adhesion of the coating layer than not using it.

Thus this invention can provide a novel both-side coated paper for printing which has so high a stiffness as to satisfy the above equation (1) and be incomparable to any conventional coated paper products, and moreover has high gloss (higher than 75%) and high smoothness (lower than 20 mmHg).

Now, an explanation will be given about why the coated paper for printing according to this invention has the excellent quality characteristics as mentioned above. This invention is characterized by that it uses a special kaolin having a narrow particle distribution as the pigment constituting the coating layer, and mixes said special copolymer latex as the binder in this kaolin, as mentioned above. More detailedly, said special kaolin with a narrow particle distribution has an average particle diameter of 0.5–1.0 μm, and a particle content ratio of 50–80 wt % for those of smaller than 1 μm in diameter, and 5% or less than 5% for those of larger than 3 μm in diameter. Such kaolin contains a smaller amount of the coarse particles of larger than 3 μm in diameter that tend to much deteriorate the paper gloss and smoothness than all the other common kaolin having the same average particle diameter as the subject kaolin has, and further has a greater average particle diameter than all the others having the same content ratio of particles smaller than 1 μm in diameter as the subject kaolin has. It is therefore characterized by a low fine and coarse particles content rate.

If this kaolin with the special particle distribution is used for the pigment constituting the coating layer, it can not only develop high gloss as it contains less coarse particles, but also increase the coating layer adhesion, compared with ordinary kaolin, even if the latex with a high Tg according to this invention is used, because it contains less fine particles which consume much binders. By its use, further, the pores existing among the pigment particles constituting the coating layer can be less filled up with fine particles, leaving many open pores among them. As a result, even after the paper was treated with a high-temperature calender to change its density into 1.15 to 1.35 $g/cm^3$, there can still remain a considerable number of pores which work to improve the ink receptivity and ink setting and make a good paper product with excellent printability.

As mentioned previously, the Clark free protruding length L measured pursuant to JIS P8143 A is an indicator of paper stiffness, and indicates that the stiffness is high when the value L is large. Further, this stiffness has a correlation with the product basis weight X ($g/m^2$), and is inevitably enhanced as the basis weight increases.

This invention can prove itself valuable for its ability to make the product with a high stiffness in spite of its low basis weight X ($g/m^2$), especially when making a coated paper for printing with the basis weight being within a range of 80~160 $g/m^2$ where the ratio of coating material amount used to the product basis weight can easily be increased.

This invention being aimed to obtain the coated paper with high gloss (higher than 75%) and high smoothness (lower than 20 mmHg), as mentioned before, an explanation will be given about the relations between the paper gloss and stiffness. When an attempt is made to obtain any high gloss by treating the paper under the increased pressure of a calender, etc., the stiffness generally lowers. This invention has the characteristics that it provides the both-side coated paper for printing that owns a high stiffness while maintaining the same high level of gloss as high-class printing papers sold in the market have. According to this invention, namely, the key to success in vesting the paper with a stiffness far higher than in conventional products while maintaining its high gloss and smoothness was that said kaolin with a narrow particle distribution had also been used as the pigment constituting the coating material, with said high Tg copolymer latex (or with both said high Tg and said low Tg copolymer latex) mixed in said kaolin as the binders, when the calender's pressure treatment was strengthened.

If the stiffness L does not satisfy the equation (1) above, the quality differences from conventional coated papers would be reduced. Even if the coated paper with such a stiffness L is used for the text pages of a book or catalogue, it could not give us any feeling of sufficient stiffness, high class or gravity about this book or catalogue.

On the other hand, though there is no special limitation on the maximum stiffness L, it should preferably be set up to satisfy the equation shown below for the convenience of handling, printing or using the product.

$$L \leq 1.28X + 100 \quad (2),$$

where L=Stiffness (mm), and X=Product basis weight (g/m2)

If the stiffness cannot meet the above equation, there may occur the possibility of the coating layers becoming too hard to avoid losing the commodity value as the paper product due to paper dust generated when the product is cut at the finishing or printing process, or paper cracks occurring at the bookbinding process.

As already mentioned before, one of the characteristics of this invention is that the kaolin whose average particle diameter is 0.5~1.0 $\mu$m, content ratio is 50–80wt % for the particles smaller than 1 $\mu$m in diameter and 5% or less than 5% for the particles larger than 3 $\mu$m in diameter is mixed in an amount of 40–90 wt % of the total pigment contained in the coating material. If the average particle diameter exceeds 1.0 $\mu$m, or the content ratio of particles smaller than 1.0 $\mu$m in diameter is less than 50 wt %, or the content ratio of particles larger than 3 $\mu$m in diameter is more than 5%, the coated paper will deteriorate in both surface gloss and smoothness. On the other hand, if the average particle diameter is smaller than 0.5 $\mu$m or the content ratio of particles smaller than 1.0 $\mu$m in diameter exceeds 80 wt %, the binder consumption by the pigments will too much increase to obtain any enough adhesion even when the copolymer latex with a high Tg according to this invention is used.

It is further important to mix this special kaolin in an amount of 40–90 wt % of the total pigment used in terms of solid matter. If the kaolin amount added is less than 40 wt %, the adhesion of the coated layer will lower or the pores formed among the pigment particles in the pigment coating layer will reduce in space, resulting in the degraded ink receptivity, delayed ink setting or the like that will lower printability. On the other hand, if the kaolin amount exceeds 90 wt %, the aqueous coating color will too much increase in viscosity to make it in high concentration, leading to the lowered smoothness of coated paper.

Next, the binders, the second main constituent of this invention, will be described. For the binders used with said special pigment, the copolymer latex with a Tg of 25°–50° C. at least is used in an amount of 5~30 wt % of the total pigment in the coating material in terms of solid matter.

If the Tg of said special high Tg latex is lower than 25° C., neither high stiffness nor gloss could be obtained even by any high-temperature calender treatment. On the other hand, if it exceeds 50° C., no sufficient coating adhesion could be achieved even by the high-temperature calender treatment. Further, if the amount of said high Tg latex is less than 5 wt % of the total pigment in the coating material, it would be undesirable because the adhesion of coating layers will be reduced. On the other hand, if it exceeds 30 wt %, it will cause the delayed ink setting, lowered ink receptivity or the like eventually resulting in the degraded printability.

According to this invention, the two kinds of copolymer latex may be used—said one with a Tg of 25°~50° C. (hereinafter referred to as "the high Tg latex") and one with a Tg of −30°~5° C. ("the low Tg latex" hereinafter). In this case, they should preferably be mixed in the total amount of 5~30 wt % of the total pigment used in the coating material in terms of solid matter, with the mixing ratio of the high to low Tg latex preferably adjusted within the range of 9:1~5:5.

In the mixing ratio of high to low Tg latex, if the high Tg latex exceeds 9 parts against 1 part of low Tg latex, no improvement on the coating adhesion can be obtained by the combined use of low Tg latex. On the other hand, if the mixing ratio of low Tg latex exceeds that of high Tg latex, no desired stiffness can be achieved.

For the high Tg latex, are available such as the vinyl acetate resin system based latex including vinyl acetate polymer, ethylene-vinyl acetate copolymer, ethylene-vinyl chloride-vinyl acetate copolymer, vinyl acetate-acryl copolymer, ethylene-vinyl acetate-acryl copolymer, etc., the conjugated diene system based copolymer latex including styrene-butadiene copolymer, methylmethacrylate-butadiene copolymer, etc., the acryl based polymer latex including acrylic acid ester and/or methacrylic acid ester polymers or copolymers, etc.

Next, as the low Tg latex, using one with a Tg of −30°~5° C. is preferable. If the Tg exceeds 5° C., no coating adhesion can be improved even by its combined use with the high Tg latex. On the other hand, if it is lower than −30° C., it would be undesirable as the stiffness of the final coated paper product for printing will largely lower.

For this low Tg latex, are for example available the vinyl acetate resin based latex including ethylene-vinyl acetate copolymer, ethylene-vinyl chloride-vinyl acetate copolymer, vinyl acetate-acryl copolymer, ethylene-vinyl acetate-acryl copolymer, etc., the conjugated diene based copolymer latex including styrene-butadiene copolymer, methyl-methacrylate-butadiene copolymer, etc., the acryl based polymer latex including acrylic acid ester and/or methacrylic acid ester polymers or copolymers, etc.

These high and low Tg latex may be manufactured by the known emulsification polymerization methods including, for example, the continuous emulsification polymerization method, the collective emulsification polymerization method, two-step emulsification polymerization method, divided emulsification polymerization method, etc., any of which will do. In the emulsification polymerization process, are available the additives and agents used in ordinary emulsification polymerization processes such as known emulsifiers, chain transfer reaction agents, polymerization initiators, chelating agents, etc. The desired Tg can be obtained by selecting the monomers used in the polymerization process or by adjusting the monomer copolymerization rate, etc.

For the binders to be mixed in the coating materials, ordinary binders including, for instance, the proteins such as casein, soybean protein, synthetic protein, etc., the synthetic resin binders such as polyvinyl alcohol, olefin-maleic anhydride acid resin, melamine resin, etc., the starches such as oxidized starch, thermochemical modified starch, etc., the cellulose derivatives such as carboxymethylcellulose, hydroxy-ethylcellulose, etc. may be used together within the range not impairing the effect aimed at by this invention, in addition to the above-specified copolymer latex.

For the pigments, one of the main ingredients of the coating materials according to this invention, at least one of the ordinary pigments for use of coated papers including, for example, the kaolin whose particle distributions are out of the above-mentioned specific range, aluminum hydroxide, ground and precipitated calcium carbonates, titanium dioxide, talc, satin white, calcined clay, organic pigments, etc. may be used together within the range not impairing the effect aimed at by this invention, in addition to the above-specified types of kaolin. Among others, the combined use of Aragonite acicular precipitated calcium carbonate having an average particle diameter of 0.1~0.5 $\mu$m with the above-specified kaolin according to this invention is most preferable, because it can form more pores among the pigment particles in the coating layers, consume less binders, and can much help strengthen the coating adhesion and obtain high gloss if the high Tg latex according to this invention is used as the binders.

Further, various agents like printability improvers, insolubilizers, antifoaming agents, releasing agents, rheology modifiers, etc. are added to the coating material, if necessary, in order to complete this preparation which should have the final concentration of 45~70 wt % in terms of solid matter.

The coating material thus prepared is applied for the outermost layer on both-side surfaces of coated paper by means of an on- or off-machine coater such as a blade coater, air knife coater, roll coater, reverse roll coater, bar coater, curtain coater, die slot coater, gravure coater, Champflex coater, size press coater or the like, in an amount that can weigh 15~30 g/m$^2$ per surface after the coating material was dried, and then dried. If the coating weight after it is dried is less than 15 g/m$^2$, the stiffness cannot be improved to the level aimed at by this invention, and if it exceeds 30 g/m$^2$, it may cause paper dust to increase in volume at the cutting process or cause more cracks at the subsequent process like a bookbinding process.

For drying the wet coating layer, one of such drying means as a steam heating cylinder, heated air drier, gas heater drier, electric heater drier, infrared-ray heater drier, high-frequency heater drier, etc. or one of such drying methods as laser heating, electronic radiation heating, dielectric heating, etc. is used independently or in combination with others. Drying requirements are that the temperature of wet coated layer must rise above the Tg of the high Tg latex used as the binders. When a heated air drier is used, for instance, the heated air temperature in a range of 120°–180° C. and the speed of heated air in a range of 20–60 m/sec are preferable. If the temperature of wet coating layer during the drying process is lower than the Tg of the high Tg latex used as the binders, i.e., if the wet coating layer has been dried at a temperature lower than the Tg of the high Tg latex, with its function as the binders left inactive, such dried coating layer is most likely to be peeled off by the high-temperature calender roll surfaces during the subsequent calendering treatment, and much retard the operation of high-temperature calendering.

There are no special limitations on base paper making methods. Any one of acid, neutral or alkaline paper making methods will do, and the base paper containing high-yield pulp may also be used. Needless to say, various kinds of recycled pulp can be used as the material pulp. Further, the base paper preliminarily coated with a coating material containing pigments, binders, other agents, etc. by means of a size press or coater such as a BILLBLADE coater, roll coater, gate roll coater, blade coater, etc. may also be used for paper making.

The both-side coated paper thus obtained is finished by passing it more than once through a calender machine heated above 100° C. through the nip consisting of metal rolls and elastic rolls heated at 100°–300° C., by which the paper is vested with high gloss and smoothness. The nip pressure, the number of times for passing nip, calendering speed, etc. can be set up suitably to obtain the optimum gloss and smoothness. The density of coated paper, after put to a high-temperature calendering treatment, should be adjusted to preferably 1.15~1.35 g/cm$^3$. If the density is lower than 1.15 g/cm$^3$, there is the possibility that the gloss and smoothness may not only fail to reach the level desired by this invention, but the coating layer adhesion becomes insufficient. Further if it exceeds 1.35 g/cm$^3$, the coating layer may become too dense and the pores among pigment particles in the coating layer largely reduced to lower the ink receptivity and delay the ink setting, producing the coated paper with poor printability.

As the calender device, are available, for example, various types of on- or off-machine calenders consisting of heatable metal roll or drum and elastic rolls, which include gloss calender, soft calender or JANUS concept calender as introduced in Japanese Journal of Paper Technology, Vol. 39, No. 3, p.12 (1996), etc. The on-machine calender cited here is not limited to any one of paper making machines, but includes those incorporated in coating machines.

As the elastic roll used in pairs with the heated metal roll in a calender device, is used a resin roll made of urethane resin, epoxy resin, polyamid resin, phenol resin, polyacrylate resin, etc. or one made of other materials—cotton, nylon, aramid fibers, etc.

Further, the elastic roll must be hard enough to be durable against heat, high temperatures and pressures, and also able to vest the coated paper with excellent gloss and smoothness. The elastic roll having Shore D hardness of 85°~95°, with its surface coarseness Rmax being ground to less than 5 $\mu$m, preferably less than 3 $\mu$m, should be used.

DETAILED DESCRIPTION OF THE PREFERRED EMBODIMENTS

Several embodiments of this invention will be described in detail below in order to more clarify the effects of this invention, but the present invention is in no way limited to them. The terms "part" and "%" in the description mean "weight part" and "weight %" unless otherwise specified.

Embodiment 1

(i) Preparation of coating material:

As the pigment, a pigment slurry with 68% solid matter concentration was prepared from 70 parts of kaolin (the trade name: Eclipse 7700/Engelhard Corporation) whose average particle diameter is 0.5 $\mu$m, and content ratio is 70% for the particles smaller than 1 $\mu$m in diameter and 3% for those larger than 3 $\mu$m in diameter, 28 parts of Aragonite acicular precipitated calcium carbonate (the trade name: TP-123CS/Okutama Kogyo K.K.) whose average particle diameter is 0.2 $\mu$m, and 2 parts of an organic pigment (the trade name: Ropaque, HP-91/Rohm & Hass Company), with 0.2 parts of sodium polyacrylate added to the pigment as a dispersing agent, using a Cowless Dissolver. To this slurry, were added 15.3 parts (in terms of solid matter) of styrene butadiene copolymer latex with a Tg of 35° C. as the high Tg latex (the trade name: P-3248/Sumika A & L), 1.7 parts (in terms of solid matter) of styrene butadiene copolymer latex with the Tg of −5° C. as the low Tg latex (the trade name: SN-101B/Sumika A & L), 2 parts (in terms of solid matter) of thermo-chemically modified starch (which is obtained by adding 0.15 parts of ammonium persulfate and 0.05 parts of sodium carbonate to 100 parts of corn starch to make a starch slurry with 35% concentration, which is then made into a paste state and modified by a thermo-chemical modifier device at a 155° C. temperature and a 5 min. keep time there, and then by adding 0.25 parts of sodium hydroxide to 100 parts of this starch slurry), 0.3 parts (in terms of solid matter) of calcium stearate as a releasing agent (the trade name: Nopcote C-104HS/San Nopco), and water to prepare the coating material with a 60% solid matter concentration.

(ii) Coating:

This coating material was applied to both-side surfaces of a wood free base paper with the basis weight of 78 g/m$^2$ made by the neutral paper making method by means of a blade coater equipped with a hot-air drier supplying 145° C. hot air blow, in an amount that can weigh 25 g/m$^2$ per surface after the coating material was dried, and then dried.

(iii) Finish by calendering:

A finished both-side coated paper for printing was obtained by passing the above both-side coated paper through the nip consisting of a pair of a chrome-plated metal roll whose surface temperature was 150° C. and an elastic resin roll with Shore D Hardness of 91° in the way that the paper surface and back can touch the metal roll surface each two times, with the nip pressure controlled at 250 kN/m and speed at 450 m/min.

Embodiment 2

Another finished both-side coated paper for printing was obtained under the same coating and calendering conditions as in Embodiment 1, except such changes that the basis weight of a base paper used in the coating was 63 g/m$^2$ and the coating weight per surface after the coating material was dried was 21 g/m$^2$.

Embodiment 3

Another finished both-side coated paper for printing was obtained under the same coating and calendering conditions as in Embodiment 1, except such changes that the basis weight of a base paper used in the coating was 101 g/m$^2$ and the coating weight per surface after the coating material was dried was 28 g/m$^2$.

Embodiment 4

Another finished both-side coated paper for printing was obtained under the same coating and calendering conditions as in Embodiment 1, except such changes that 15 parts (in terms of solid matter) of styrene butadiene copolymer latex with a Tg of 44° C. as the high Tg latex (the trade name: P-3250/Sumika A & L) and 4 parts (in terms of solid matter) of styrene butadiene copolymer latex with a Tg of −5° C. as the low Tg latex (the trade name: SN-101B/Sumika A & L) were used in the preparation of coating material.

Embodiment 5

Another finished both-side coated paper for printing was obtained under the same coating and calendering conditions as in Embodiment 1, except such changes that 15 parts (in terms of solid matter) of styrene butadiene copolymer latex with a Tg of 26° C. as the high Tg latex (the trade name: P-3255/Sumika A & L) and no low Tg latex was added in the preparation of coating material.

Embodiment 6

Another finished both-side coated paper for printing was obtained under the same coating and calendering conditions as in Embodiment 1, except such changes that 50 parts of the kaolin, as a pigment, whose average particle diameter was 0.7 μm, and content ratio was 74% for the particles smaller than 1 μm in diameter and 5% for those larger than 3 μm in diameter (the trade name: Kaogloss 90/Thiele Kaolin Company), 37 parts of precipitated calcium carbonate (the trade name: TP-123CS/Okutama Kogyo K.K.), 10 parts of ground calcium carbonate (the trade name: FMT-90/FMT) and 3 parts of an organic pigment (the trade name: Ropaque HP-91/Rohm & Hass Company) were added in the preparation of coating material.

Embodiment 7

Another finished both-side coated paper for printing was obtained under the same coating and calendering conditions as in Embodiment 1, except such a change that 120° C. was used for the metal roll surface temperature during calendering operation.

Embodiment 8

Another finished both-side coated paper for printing was obtained under the same coating and calendering conditions as in Embodiment 1, except such a change that the precipitated calcium carbonate used to make the coating material in Embodiment 1 was changed into a calcite rhombohedral whose average particle diameter was 0.3 μm (the trade name: Brilliant S-15/Shiraishi Kogyo K.K.).

Embodiment 9

(i) Preparation of the under coating material

A pigment slurry with a 72% solid matter concentration was prepared from 20 parts of kaolin (the trade name: HT/Engelhard Corporation) and 80 parts of ground calcium carbonate (the trade name: FMT-90/FMT), with 0.2 parts of sodium polyacrylate as a dispensing agent, using a Cowless Dissolver. To this slurry, were added 6 parts (in terms of solid matter) of styrene butadiene copolymer latex with a −5° C. Tg (the trade name: SN-101B/Sumika A&L), 8 parts (in terms of solid matter) of oxidized starch (the trade name: Ace-C/Oji Cornstarch K.K.) prepared in a paste state beforehand and water to prepare the coating material with a 65% solid matter concentration.

(ii) Bottom coating

Next, this bottom coating material was applied to the both-side surfaces of the same wood free base paper as used in Embodiment 1 under the same coating conditions as in Embodiment 1, except that the coating was done in an amount of 8 g/m$^2$ per surface after the coating material was dried.

(iii) Top coating

The coating material used in Embodiment 1 was used for the top coating on the bottom coated base paper obtained in (ii) under the same coating conditions as used in Embodiment 1, except that the coating was done in an amount of 17 g/m$^2$ after the coating material was dried.

(iv) Finish by calendering

A both-side coated paper for printing was obtained by calendering under the same calendering conditions as used in Embodiment 1.

Reference 1

Another finished both-side coated paper for printing was obtained under the same coating and calendering conditions as in Embodiment 1, except such a change that the kaolin whose average particle diameter was 0.3 μm, and content ratio was 76% for the particles smaller than 1 μm in diameter and 8% for those larger than 3 μm in diameter (the trade name: HT/Engelhard Corporation) was used to make the coating material.

Reference 2

Another finished both-side coated paper for printing was obtained under the same coating and calendering conditions as in Embodiment 1, except such a change that the kaolin whose average particle diameter was 0.3 μm, and content ratio was 86% for the particles smaller than 1 μm in diameter and 3% for those larger than 3 μm in diameter (the trade name: Miragloss/Engelhard Corporation) was used to make the coating material.

Reference 3

Another finished both-side coated paper for printing was obtained under the same coating and calendering conditions as in Embodiment 1, except such a change that the kaolin whose average particle diameter was 0.2 μm, and content ratio was 98% for the particles smaller than 1 μm in diameter and 0% for those larger than 3 μm in diameter (the trade name: Amazon 88/CADAM) was used to make the coating material.

Reference 4

Another finished both-side coated paper for printing was obtained under the same coating and calendering conditions as in Embodiment 1, except such a change that the kaolin whose average particle diameter was 0.6 μm, and content ratio was 65% for the particles smaller than 1 μm in diameter and 12% for those larger than 3 μm in diameter (the trade name: Nuclay/Engelhard Corporation) was used to make the coating material.

Reference 5

Another finished both-side coated paper for printing was obtained under the same coating and calendering conditions as in Embodiment 6, except such a change that the kaolin whose average particle diameter was 2.3 μm, and content ratio was 30% for the particles smaller than 1 μm in diameter and 40% for those larger than 3 μm in diameter (the trade name: ND-2510/ECC) was used to make the coating material in the Embodiment 6.

Reference 6

Another finished both-side coated paper for printing was obtained under the same coating and calendering conditions as in Embodiment 5, except such a change that 15 parts (in terms of solid matter) of styrene butadiene copolymer latex with a Tg of 15° C. (the trade name: SN-337/Sumika A&L) was used to make the coating material in the Embodiment 5.

Reference 7

Another finished both-side coated paper for printing was obtained under the same coating and calendering conditions as in Embodiment 1, except that the mixing rate of kaolin (the trade name: Eclipse 7700/Engelhard Corporation) was changed into 35 parts and that of precipitated calcium carbonate (the trade name: TP-123CS/Okutama Kogyo K.K.) into 63 parts.

Reference 8

Another finished both-side coated paper for printing was obtained under the same coating and calendering conditions as in Embodiment 1, except such a change that the coated paper was passed through the calender nip so that its top surface and bottom surface can contact the metal roll respectively three times.

Reference 9

Another finished both-side coated paper for printing was obtained under the same coating and calendering conditions as in Embodiment 4, except such changes that 60° C. was used for the hot air temperature and that the wet coating layer temperature during drying was controlled at a level below the Tg of the high Tg latex.

Reference 10

Another finished both-side coated paper for printing was obtained in the same coating and calendering conditions as in Reference 6, except that the basis weight of base paper was changed into 101 g/m$^2$ and that the coating weight per surface after the coating material was dried was changed into 28 g/m$^2$.

Reference 11

Another finished both-side coated paper for printing was obtained in the same coating and calendering conditions as in Reference 6, except that the basis weight of base paper was changed into 128 g/m$^2$ and that the coating weight per surface after the coating material was changed into 28 g/m$^2$.

Reference 12

Another finished both-side coated paper for printing was obtained in the same coating and calendering conditions as in Embodiment 9, except that the coating weight per surface after the coating material was dried in the under coating was changed into 15 g/m$^2$, and that in the top coating was changed into 10 g/m$^2$.

Measurement was made on the paper quality in Embodiments 1 through 9 and References 1 through 12, and the results are shown in Table 1. By the way, the pigment particle diameters, latex's Tgs and the quality of coated papers were evaluated by the methods and based on the standards as shown below.

Pigment particle distributions;

The average particle diameter is defined to be a particle diameter when the accumulated weight of particles from either end of fine or coarse ones has reached 50% in a test using the precipitation method (the measuring instrument: SEDIGRAPH 5000/Shimadzu). The content ratio of particles smaller than 1 μm in diameter is an accumulated weight % of the particles from fine end to 1 μm in diameter, and that of particles larger than 3 μm in diameter is an accumulated weight % of the particles from coarse end to 3 μm in diameter.

Latex Tg;

A copolymer latex was dried at room temperature to prepare a film and then measured the film with a differential scanning calorimeter (DSC-8230D/Rigaku) at a temperature rise speed of 10° C./minute.

Density;

The density was measured pursuant to JIS P-8118.

Degree of gloss;

It was evaluated pursuant to JIS P-8142. As the measured value increased, the degree of gloss increased.

Smoothness;

It was evaluated pursuant to Japan Tappi paper and pulp test method No. 5A. The smoothness increases as the measured value decreases.

Adhesion of the coating layer;

An RI printability tester (Akira Seisakusho) was used to repeat printing with the ink Tack Value 12 until any partial pick of coating layer occurred, and the coating layer adhesion was evaluated based on each printing repetition frequency according to the standards shown below.

4: The level where the adhesion is so strong that coated paper for printing has no problem.

3: The level where the adhesion is the standard level for the coated paper for sheet-fed offset printing.

2: The level where the adhesion is rather weak but it can be made up for to make the coated paper for sheet-fed offset printing printable by adjusting the printing conditions including lowering the ink tack, etc.

1: The level where the adhesion is so weak that the coated paper cannot be used for sheet-fed offset printing.

Ink setting;

An RI printability tester (Akira Seisakusho) was used to print 0.5 ml black ink for use of sheet-fed offset printing on a sheet of a coated paper, and 30 seconds after the printing, another sheet of wood free paper (non-coated paper) was placed on top of the printed sheet surface under pressure and the resulting ink set-off conditions on said wood free paper were evaluated according to the standards shown below.

4: The level where the ink setting is so fast that there is no need to increase spray powder even at the printing speed of 10,000 sheets/hour in sheet-fed offset printing, and there is no problem of set-off.

3: The level where the ink setting is the standard for coated paper for sheet-fed offset printing.

2: The level where the ink setting is rather slow but it can be made up for to make the coated paper for sheet-fed offset printing printable by adjusting the printing conditions including increasing spray powder, etc.

1: The level where the ink setting is too slow for the coated paper to be used for sheet-fed offset printing.

Ink receptivity;

An RI printability tester (Akira Seisakusho) was used to print 0.5 ml black ink for sheet-fed offset printing on the surface of a coated paper which had been wet with a certain amount of water beforehand, and the ink receptivity was evaluated according to the standards shown below.

4: The level where the ink receptivity is very good and printing is possible even if the fountain solution has increased in sheet-fed offset printing.

3: The level where the ink receptivity is the standard one for coated paper for sheet-fed offset printing.

2: The level where the ink receptivity is rather low, but it can be made up for to make the coated paper for sheet-fed offset printing printable by adjusting the printing conditions including reducing the amount of fountain solution used, etc.

1: The level where the ink receptivity is too poor for the coated paper to be used for sheet-fed offset printing.

Stiffness (L);

The free protruding lengths in the machine and cross directions were measured pursuant to JIS P-8143 A, and their average value was shown (mm).

Runnability of calendering operation;

In each Embodiment and Reference, the coated paper finished by a 10,000 m calendering was evaluated based on the contamination or the conditions of coating material adhered to the metal roll surface, according to the standards shown below.

4: There is no contamination at all on the metal roll surface.

3: The metal roll surface is slightly soiled but has no coating material attached.

2: A little coating material adheres to the metal roll surface.

1: Much coating material adheres to the metal roll surface.

Stiffness of the book (feeling of high class and gravity);

A 30-page stitch-bound catalogue book was prepared with the both-side coated papers obtained in each Embodiment and Reference, and the feeling of its stiffness when the book was taken up in hand by grasping its back was evaluated according to the standards shown below.

A: A feeling of equal stiffness can be obtained between the catalogue books prepared with an embodiment coated paper with a basis weight one-rank lighter than the reference coated paper using no high Tg latex, more concretely, between the catalogue books made with an embodiment coated paper with a 105 g/m$^2$ basis weight and with a reference coated paper with a 128 g/m$^2$ basis weight (according to the reference 6); between those made with an embodiment coated paper with a 128 g/m$^2$ basis weight and a reference coated paper with a 157 g/m$^2$ basis weight (according to the reference 10); and between those made with an embodiment coated paper with a 157 g/m$^2$ basis weight and a reference coated paper with a 184 g/m$^2$ basis weight (according to the reference 11); and the catalogue books made with the embodiment coated paper with a basis weight can clearly give a stronger feeling of high class and heaviness than those using no high Tg latex and being made with any reference coated paper with the same basis weight.

B: No feeling of equal stiffness can be obtained yet between the catalogue books prepared with an embodiment coated paper with a basis weight one-rank lighter than the reference coated paper using no high Tg latex, more concretely, between the catalogue books made with an embodiment coated paper with a 105 g/m$^2$ basis weight and with a reference coated paper with a 128 g/m$^2$ basis weight (according to the reference 6); between those made with an embodiment coated paper with a 128 g/ m$^2$ basis weight and a reference coated paper with a 157 g/m$^2$ basis weight (according to the reference 10); and between those made with an embodiment coated paper with a 157 g/m$^2$ basis weight and a reference coated paper with a 184 g/m$^2$ basis weight (according to the reference 11); but the catalogue books made with the embodiment coated paper with a basis weight can at least be felt clearly stiffer than those made with any reference coated paper with the same basis weight, and using no high Tg latex.

Effect of the Invention

As clearly shown in the measurement results in Table 1, the both-side coated paper according to this invention is excellent in gloss, smoothness and printability on one hand, and has high stiffness and can give a feeling of a high-class paper when used for text pages of books on the other.

TABLE 1

| | Basis weight $g/m^2$ | Density $g/cm^3$ | Gloss % | Smoothness mmHg | Adhesion | Ink setting | Ink receptivity | Stiffness mm | Runnability of calendering operation | Stiffness of the book |
|---|---|---|---|---|---|---|---|---|---|---|
| Embod. 1 | 128 | 1.25 | 85 | 10 | 3 | 3 | 3 | 226 | 3 | A |
| 2 | 105 | 1.28 | 84 | 12 | 3 | 3 | 3 | 196 | 3 | A |
| 3 | 157 | 1.21 | 85 | 10 | 3 | 3 | 3 | 255 | 3 | A |
| 4 | 128 | 1.25 | 88 | 8 | 2 | 2 | 2 | 235 | 2 | A |
| 5 | 128 | 1.25 | 82 | 14 | 4 | 4 | 4 | 215 | 3 | B |
| 6 | 128 | 1.24 | 88 | 10 | 4 | 3 | 3 | 226 | 3 | A |
| 7 | 128 | 1.20 | 78 | 16 | 2 | 4 | 4 | 222 | 4 | A |
| 8 | 128 | 1.24 | 81 | 10 | 2 | 3 | 3 | 225 | 3 | A |
| 9 | 128 | 1.26 | 90 | 6 | 3 | 3 | 3 | 215 | 3 | B |
| Refer. 1 | 128 | 1.25 | 70 | 22 | 2 | 3 | 2 | 225 | 3 | |
| 2 | 128 | 1.25 | 88 | 8 | 1 | 4 | 3 | 224 | 2 | |
| 3 | 128 | 1.25 | 90 | 7 | 1 | 4 | 3 | 224 | 1 | |
| 4 | 128 | 1.25 | 68 | 24 | 3 | 2 | 3 | 226 | 3 | |
| 5 | 128 | 1.25 | 50 | 40 | 4 | 1 | 1 | 228 | 3 | |
| 6 | 128 | 1.25 | 80 | 14 | 4 | 3 | 3 | 195 | 3 | Used in evaluation |
| 7 | 128 | 1.26 | 72 | 23 | 1 | 3 | 3 | 222 | 2 | |
| 8 | 128 | 1.32 | 90 | 6 | 4 | 1 | 1 | 225 | 2 | |
| 9 | 128 | 1.26 | 90 | 5 | 1 | 4 | 4 | 215 | 1 | |
| 10 | 157 | 1.21 | 78 | 16 | 4 | 3 | 3 | 240 | 3 | Used in evaluation |
| 11 | 184 | 1.19 | 77 | 16 | 4 | 3 | 3 | 253 | 3 | Used in evaluation |
| 12 | 128 | 1.26 | 90 | 6 | 3 | 3 | 3 | 205 | 1 | |

We claim:

1. In the both-side coated paper for use of printing made by coating the coating material containing pigments and binders as the main ingredients on the surface of a base paper, drying the applied coating material, and then passing the coated base paper through a high-temperature calender heated above 100° C., a both-side coated paper for use of printing characterized by that the density measured after the finish pursuant to JIS P8118 is 1.15–1.35 $g/cm^3$, the gloss of coated paper surface measured after the finish pursuant to JIS P8142 is higher than 75%, the smoothness measured by the SMOOSTER under J. TAPPI paper and pulp test method, No. 5A is lower than 20 mmHg, and the mean value L of Clark free protruding lengths in the machine and cross directions measured pursuant to JIS P8143 A can satisfy the following equation (1) below:

$$L>1.28X+45, \quad (1)$$

where

L=Mean value of Clark free protruding lengths in the machine and cross directions (mm), and X=Product basis weight ($g/m^2$);

wherein the outermost coating layer on both sides of said coated paper contains the kaolin as a pigment whose average particle diameter is 0.5–1.0 μm, and content ratio is 50–80 wt % for the particles smaller than 1 μm in diameter and 5% or less than 5% for the particles larger than 3 μm in diameter, in an amount of 40–90 wt % of the total pigment used, and the copolymer latex with a Tg of 25°–50° C. as the binder, in an amount of 5–30 wt % in terms of solid matter of the total pigment contained; and wherein the coating weight per surface is 15–30 $g/m^2$ after the coating material is dried.

2. The both-side coated paper for use of printing according to claim 1, wherein (a) a copolymer latex with a Tg of 25°–50° C. and (b) a copolymer latex with a Tg of –30°–5° C. are contained as the binders in an amount of 5–30 wt % in terms of solid matter of the total pigment contained, and the mixing ratio of said copolymer latex (a) and (b) is 9:1 to 5:5.

* * * * *